United States Patent
Marion et al.

(10) Patent No.: US 8,985,293 B2
(45) Date of Patent: Mar. 24, 2015

(54) DECOUPLER ASSEMBLY WITH SLIDING INTERFACE BETWEEN HUB AND PULLEY

(75) Inventors: Patrick Marion, Toronto (CA); Lucas Wilson, Toronto (CA)

(73) Assignee: Litens Automotive Partnership, Woodbridge (CA)

( * ) Notice: Subject to any disclaimer, the term of this patent is extended or adjusted under 35 U.S.C. 154(b) by 151 days.

(21) Appl. No.: 13/642,814

(22) PCT Filed: May 25, 2011

(86) PCT No.: PCT/CA2011/000618
§ 371 (c)(1),
(2), (4) Date: Oct. 22, 2012

(87) PCT Pub. No.: WO2011/147024
PCT Pub. Date: Dec. 1, 2011

(65) Prior Publication Data
US 2013/0037370 A1    Feb. 14, 2013

Related U.S. Application Data

(60) Provisional application No. 61/347,916, filed on May 25, 2010.

(51) Int. Cl.
| F16H 55/36 | (2006.01) |
| F16D 41/20 | (2006.01) |
| F16D 3/12  | (2006.01) |
| F16D 13/76 | (2006.01) |
| F16D 43/21 | (2006.01) |
| F16D 43/24 | (2006.01) |

(52) U.S. Cl.
CPC .............. *F16D 41/206* (2013.01); *F16D 13/76* (2013.01); *F16D 43/211* (2013.01); *F16D 43/24* (2013.01); *F16H 55/36* (2013.01); *F16H 2055/366* (2013.01)
USPC .................. 192/55.5; 192/41 S; 192/113.32; 474/94; 464/40

(58) Field of Classification Search
CPC ................................................. F16H 2055/366
USPC .......................... 192/55.5; 474/74, 94; 464/40
See application file for complete search history.

(56) References Cited

U.S. PATENT DOCUMENTS

| 5,598,913 A    | 2/1997 | Monahan et al. |
| 7,975,821 B2 * | 7/2011 | Antchak et al. ............... 192/55.1 |

(Continued)

FOREIGN PATENT DOCUMENTS

| JP | 2168062 A | 6/1990 |
| WO | 2004/011818 A1 | 2/2004 |

*Primary Examiner* — Richard Lorence
(74) *Attorney, Agent, or Firm* — Millman IP Inc.

(57) ABSTRACT

In one aspect, the invention is directed to a decoupler assembly for between an endless drive element and a shaft. The endless drive element may be, for example, an accessory drive belt from a vehicular engine. The shaft may be, for example, the input shaft of a belt-driven accessory, such as an alternator or a compressor. The decoupler assembly includes a hub that mounts to the shaft, a pulley that is rotatable with respect to the hub, a dampening spring and a clutch member. A part of the pulley is supported on a pulley support surface on the hub. There is a gap between the pulley and the pulley support surface. The gap has lubricant therein to facilitate sliding between the pulley and the pulley support surface. By eliminating the use of a polymeric bushing between pulley and the hub, there are several advantages that are provided.

12 Claims, 6 Drawing Sheets

(56) References Cited

U.S. PATENT DOCUMENTS

| | | |
|---|---|---|
| 2003/0098214 A1 | 5/2003 | Titus et al. |
| 2007/0240964 A1* | 10/2007 | Saito et al. .................. 192/41 S |
| 2009/0176583 A1* | 7/2009 | Dell et al. ...................... 464/40 |
| 2009/0176608 A1* | 7/2009 | Jansen et al. .................... 474/74 |

\* cited by examiner

DECOUPLER ASSEMBLY WITH SLIDING INTERFACE BETWEEN HUB AND PULLEY

CROSS REFERENCE TO RELATED APPLICATIONS

This application is a national phase entry application of PCT/CA2011/000618, filed May 25, 2011, which claims the benefit of U.S. Provisional Application No. 61/347,916, filed May 25, 2010.

FIELD OF THE INVENTION

The present invention relates to decoupling mechanisms for allowing belt driven accessories to operate temporarily at a speed other than the speed of the belt, and more particularly to decoupling mechanisms that incorporate wrap-spring clutches.

BACKGROUND OF THE INVENTION

It is known to provide a decoupling mechanism on an accessory, such as an alternator, that is driven by a belt from an engine in a vehicle. Such a decoupling mechanism, which may be referred to as a decoupler, permits the associated accessory to operate temporarily at a speed that is different than the speed of the belt. For example, when there is a sudden stoppage of the belt when the belt was running and driving rotation of the alternator shaft, the decoupler permits the alternator shaft to continue rotating temporarily as a result of inertia until it decelerates to a stop as a result of drag, thereby reducing the stress on the alternator shaft. As another example, the decoupler permits the alternator shaft to rotate at a relatively constant speed even though the crankshaft from the engine undergoes a cycle of decelerations and accelerations associated with the movement of the pistons.

Such decouplers are valuable additions to the powertrain of the vehicle. However, there is a continuing need to reduce their cost, to improve their operating life, to reduce their complexity and to simplify their manufacture. It would thus be beneficial to provide a decoupler that addresses one or more of these continuing needs.

SUMMARY OF THE INVENTION

In one aspect, the invention is directed to a decoupler assembly for between an endless drive element and a shaft. The endless drive element may be, for example, an accessory drive belt from a vehicular engine. The shaft may be, for example, the input shaft of a belt-driven accessory, such as an alternator or a compressor. The shaft could alternatively be the crankshaft from the engine. The decoupler assembly includes a hub that mounts to the shaft, a pulley that is rotatable with respect to the hub, a dampening spring and a clutch member. A part of the pulley is supported on a pulley support surface on the hub. There is a gap between the pulley and the pulley support surface. The gap has lubricant therein to facilitate sliding between the pulley and the pulley support surface. By eliminating the use of a polymeric bushing between pulley and the hub, there are several advantages that are provided. One advantage is that the assembling process may be more easily automated than with prior art assemblies which typically require the polymeric bushing to be manually fitted onto the hub. Another advantage is that the tolerance range may be smaller and may be more easily controlled to ensure that there is never an interference fit (i.e. negative clearance) between the hub and the pulley. Another advantage is that, in at least some embodiments, the surface area of engagement between the pulley support surface and the pulley may be larger than it is between the bushing and the pulley, without requiring a longer axial length for the decoupler assembly relative to the prior art. This increased surface area reduces the pressure at the interface between the pulley and the hub, which reduces the amount of wear between the two components. The reduced wear improves the longevity of the decoupler assembly, can reduce friction and thereby improve fuel economy for the vehicle, and can reduce any tilt imparted to the pulley by the belt. Other advantages may also be provided.

In a particular embodiment of the first aspect, the decoupler assembly includes a hub that is adapted to be coupled to the shaft such that the shaft co-rotates with the hub about a rotational axis, a pulley, a dampening spring positioned to transmit torque between the hub and a carrier, and a helical clutch spring. The pulley has an outer surface and an inner surface. The outer surface is adapted to engage the endless drive element. A bearing is positioned between the inner surface of the pulley and the hub. A pulley support surface on the hub slidingly supports the inner surface of the pulley. The bearing and the pulley support surface together support the pulley for rotation relative to the hub. The clutch spring expands radially to operatively connect the pulley and the carrier when the pulley is rotated faster than the hub in a first rotational direction, thereby driving the hub with the pulley. The clutch spring contracts radially to operatively disconnect the pulley and the hub when the pulley rotates more slowly than the hub in the first rotational direction. The pulley and the hub cooperate to define a chamber in which the clutch spring is disposed, and which includes a gap between the pulley support surface and the inner surface of the pulley. The chamber is filled with a lubricant.

In a further embodiment the radial contraction of the clutch spring causes the clutch spring to extend axially towards the gap and to urge lubricant into the gap.

BRIEF DESCRIPTION OF THE DRAWINGS

The present invention will now be described by way of example only with reference to the attached drawings, in which.

DETAILED DESCRIPTION OF THE INVENTION

Figure 1:
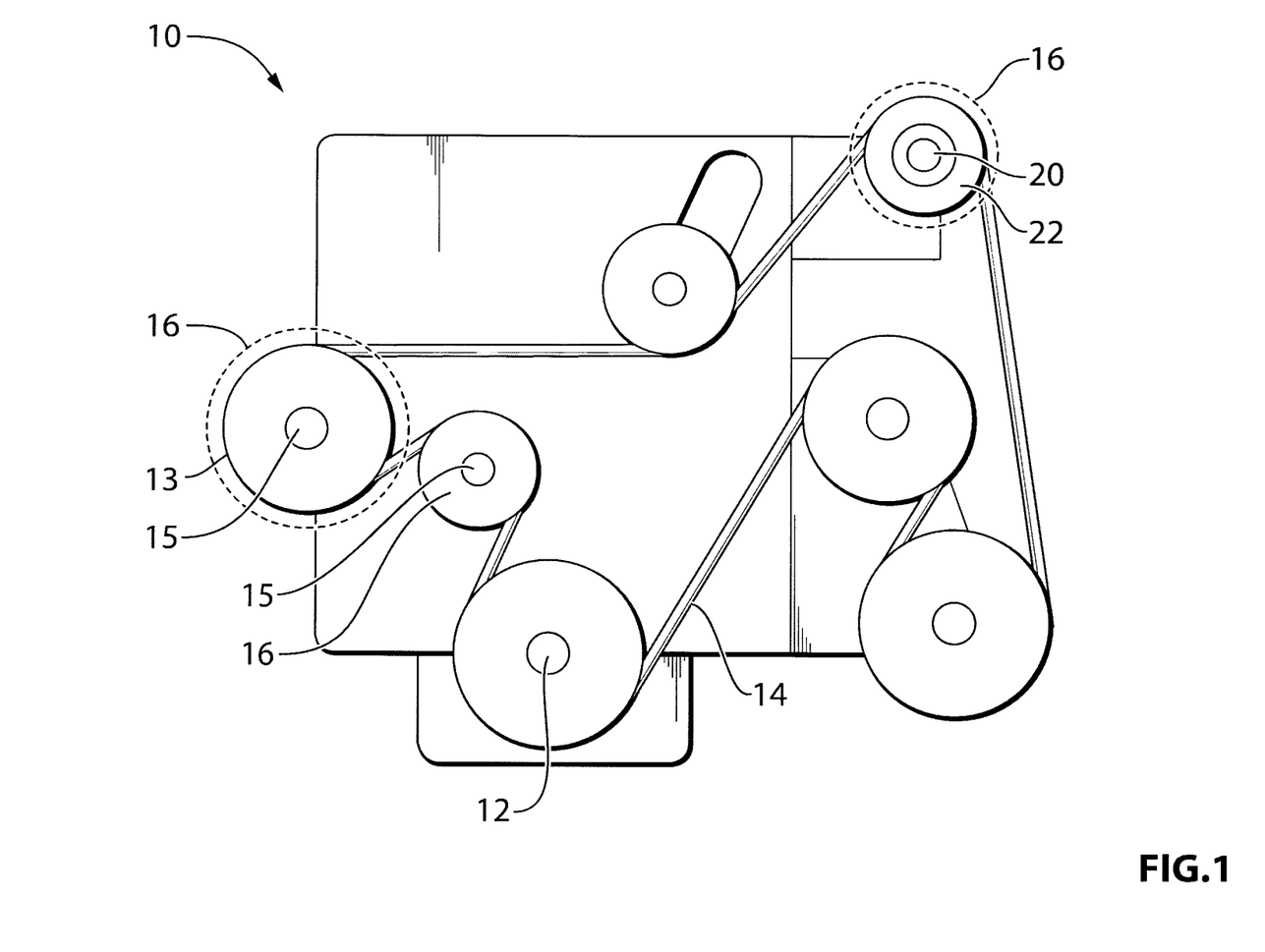
FIG. 1 is an elevation view of an engine with a plurality of belt driven accessories, one of which has a decoupler assembly in accordance with an embodiment of the present invention.

Reference is made to FIG. 1, which shows an engine 10 for a vehicle. The engine 10 includes a crankshaft 12 which drives an endless drive element, which may be, for example, a belt 14. Via the belt 14, the engine 10 drives a plurality of accessories 16 (shown in dashed outlines), such as an alternator and a compressor. Each accessory 16 includes an input drive shaft 15 with a pulley 13 thereon, which is driven by the belt 14. A decoupler assembly 20 is provided instead of a pulley, between the belt 14 and the input shaft 15 of any one or more of the belt driven accessories 16. The decoupler assembly 20 transfers torque between the belt 14 and the shaft 15 but automatically decouples the shaft 15 from the belt 14 when the belt 14 decelerates relative to the shaft 15. Additionally, the decoupler assembly 20 allows the speed of the belt 14 to oscillate relative to the shaft 15. Thus, oscillations in the belt speed that are the result of oscillations in the speed of the crankshaft (an inherent property of internal combustion piston engines), are dampened by the decoupler assembly 20, and as a result, the stresses that would otherwise be incurred by the shaft 15 and the component 16 are reduced.

Figure 2:
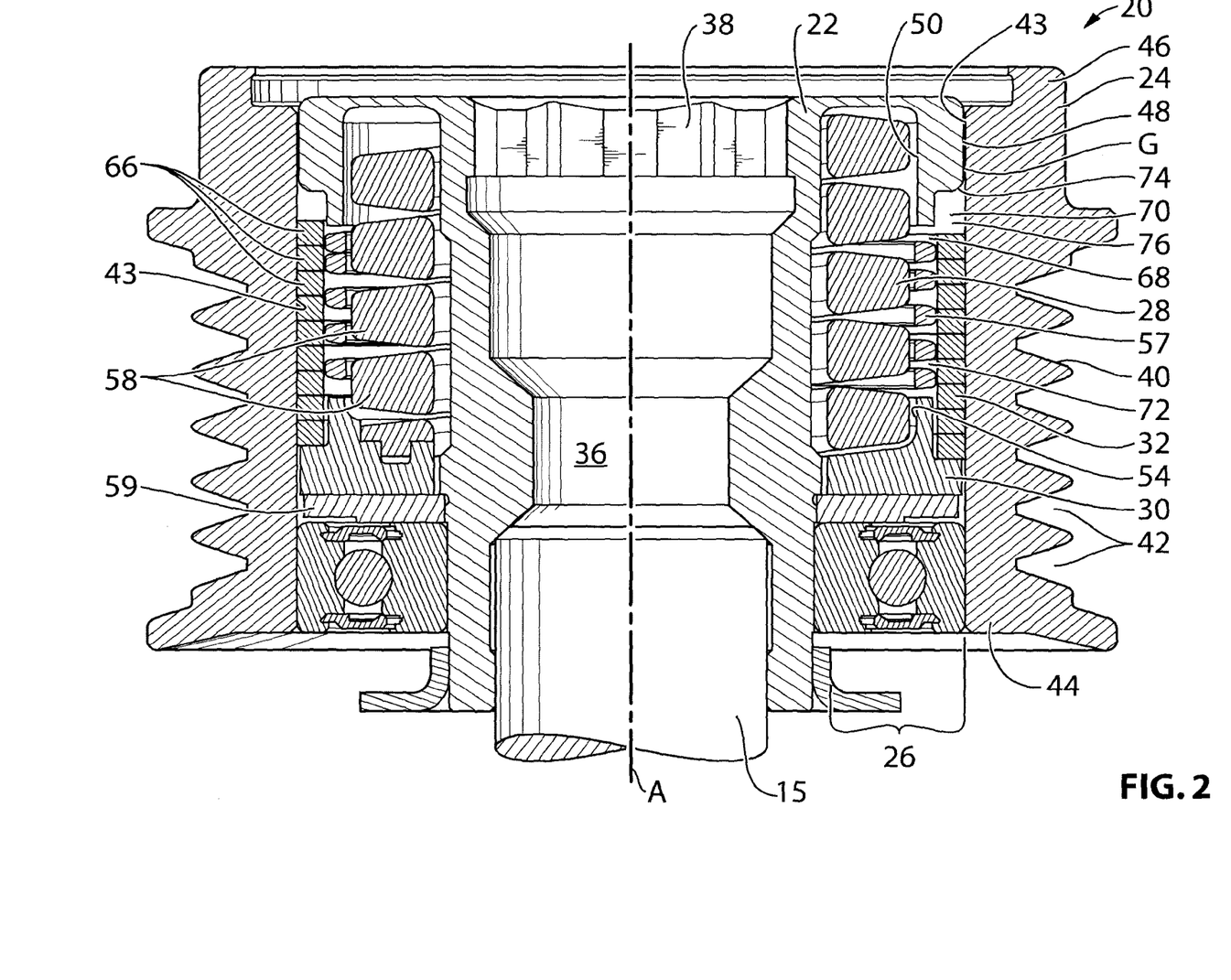
FIG. 2 is a magnified sectional view of the decoupler assembly shown in FIG. 1.

Reference is made to FIG. 2, which shows a sectional view of the decoupler assembly 20. The decoupler assembly 20 includes a hub 22, a pulley 24, a bearing 26, a dampening spring 28, a carrier 30, a clutch spring 32 and an end cap 34.

The hub 22 may be adapted to mount to the shaft 15 in any suitable way. For example, the hub 22 may have a shaft-mounting aperture 36 therethrough that defines a rotational axis A for the decoupler assembly 20. The shaft mounting aperture 36 may be configured to snugly receive the end of the shaft 15. A shaft-mounting fastener (not shown) may be inserted through a distal end 38 of the aperture 36 to fixedly mount the hub 22 to the shaft 15 so that the two co-rotate together about the axis A.

The pulley 24 is rotatably coupled to the hub 22. The pulley 24 has an outer surface 40 which is configured to engage the belt 14. The outer surface 40 is shown as having grooves 42. The belt 14 may thus be a multiple-V belt. It will be understood however, that the outer surface 40 of the pulley 24 may have any other suitable configuration and the belt 14 need not be a multiple-V belt. For example, the pulley 24 could have a single groove and the belt 14 could be a single V belt, or the pulley 24 may have a generally flat portion for engaging a flat belt 14.

The pulley 24 further includes an inner surface 43. The bearing 26 engages the inner surface 43 of the pulley 24 and rotatably supports the pulley 24 on the hub 22 at a first (proximal) axial end 44 of the pulley 24. The bearing 26 may be any suitable type of bearing, such as a sealed ball bearing.

At a second (distal) axial end 46 of the pulley 24, the inner surface 43 of the pulley 24 is slidably supported on a pulley support surface 48 of the hub 22. The bearing 26 and the pulley support surface 48 together support the pulley 24 for rotation relative to the hub 22. The sliding support provided by the pulley support surface 48 is described in more detail further below.

Figure 3:
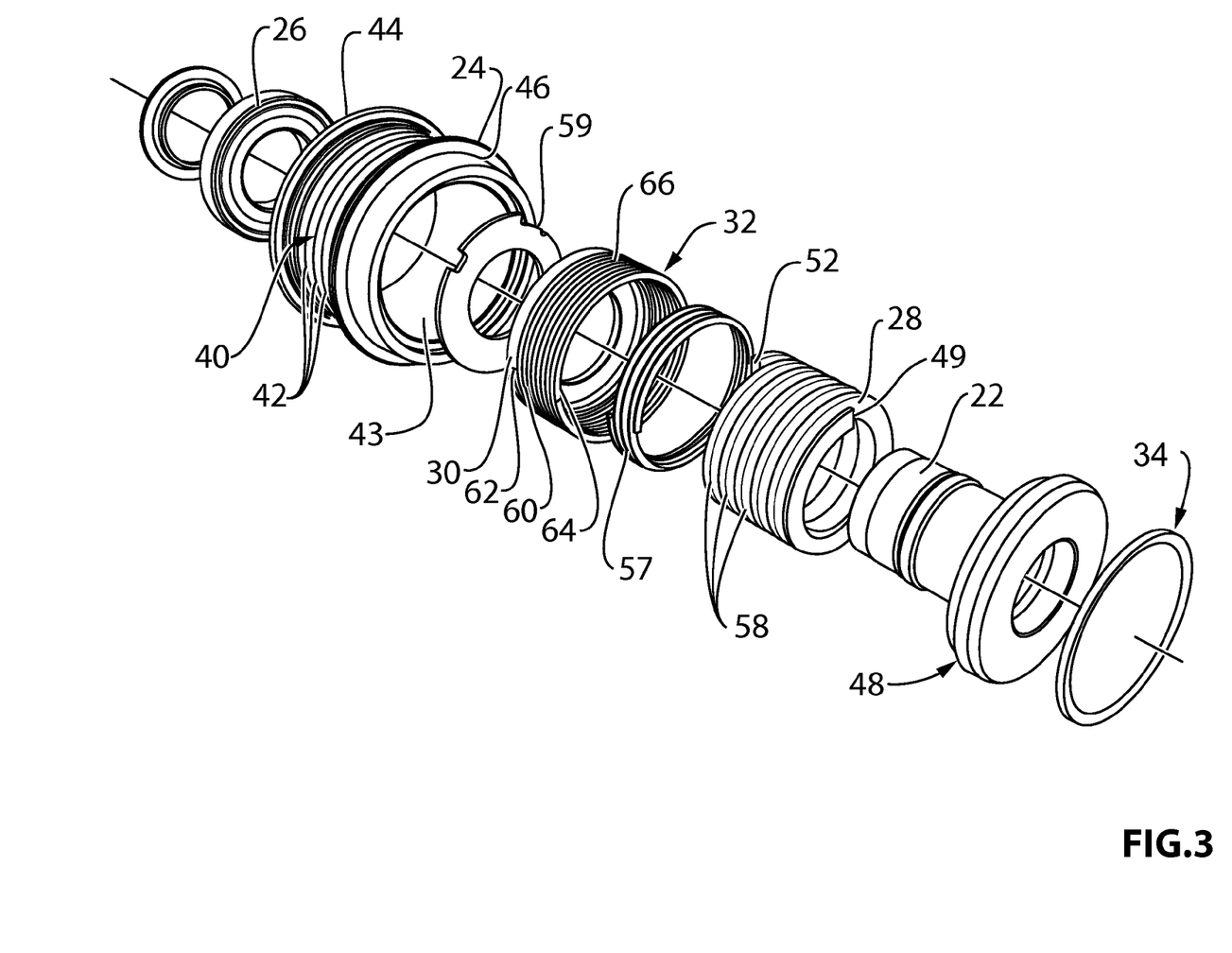
FIG. 3 is an exploded perspective view of the decoupler assembly shown in FIG. 1.

The dampening spring 28 is provided to accommodate oscillations in the speed of the belt 14 relative to the shaft 15. The dampening spring 28 may be a torsion spring that has a first end 49 (FIG. 3) that is held in an annular slot 50 (FIG. 2) and that abuts a radial wall (not shown) in the hub 22. The dampening spring 28 may further have a second end 52 that is held in an annular slot 54 and that abuts a radial wall (not shown) in the carrier 30. In the embodiment shown, the dampening spring 28 has a plurality of coils 58 between the first and second ends 49 and 52. An example of a suitable engagement between the dampening spring 28, the hub 22 and the carrier 30 is shown and described in U.S. Pat. No. 7,712,592, the contents of which are hereby incorporated by reference.

In the embodiment shown, a sleeve 57 is provided between the dampening spring 28 and the clutch spring 32. The sleeve 57 is, in the embodiment shown, a helical member itself, although it could have any other suitable configuration such as a hollow cylindrical shape. The sleeve 57 acts as a torque limiter by limiting the amount of room available for radial expansion of the dampening spring 28 (in embodiments wherein the dampening spring 28 is a torsion spring). Thus when a torque is provided by the pulley 24 that exceeds a selected limit, the dampening spring 28 expands until it is constrained by the sleeve 57. An example of a suitable sleeve 57 is shown and described in U.S. Pat. No. 7,766,774, the contents of which are hereby incorporated by reference.

The dampening spring 28 may be compressed axially slightly in the decoupler assembly 20 such that it urges the carrier 30 axially into abutment with a thrust plate, shown at 59, which is in abutment with the bearing 26, which is press-fit between the hub 22 and the pulley 24.

The helical clutch spring 32 has a first end 60 (FIG. 3) that is engageable with a radial wall 62 of the carrier 30 and that may be fixedly connected to the carrier 30. The helical clutch spring 32 has a second end 64 that may be free floating. The helical clutch spring 32 includes a plurality of coils 66 between the first and second ends 60 and 64.

Thus, a torque path is provided from the pulley 22 through the clutch spring 32, through the carrier 30, through the dampening spring 29 and into the hub 22.

When a torque is applied from the belt 14 to the pulley 24 to drive the pulley 24 at a speed that is faster than that of the shaft 15, friction between the inner surface 43 of the pulley 24 and the coils 66 of the clutch spring 32 drives at least one of the coils 66 of the clutch spring 32 at least some angle in a first rotational direction about the axis A, relative to the first end 60 of the clutch spring 32. The relative movement between the one or more coils 66 driven by the pulley 24 relative to the first end 60 causes the clutch spring to expand radially, which further strengthens the grip between the coils 66 of the clutch spring 32 and the inner surface 43 of the pulley 24. As a result, the first end 60 of the clutch spring 32 transmits the torque from the pulley to the carrier 30. The carrier 30 transmits the torque to the hub 22 through the dampening spring 28. As a result, the hub 22 is brought up to the speed of the pulley 24. Thus, when the pulley 24 rotates faster than the hub 22, the clutch spring 32 operatively connects the pulley 24 to the carrier and therefore to the hub 22.

While running, the belt 14 may undergo oscillations in speed due to speed oscillations in the crankshaft 12 that naturally occur during operation of the engine 10. These speed oscillations may be rapid and so the clutch spring 32 may remain at least somewhat engaged with the pulley 24 throughout them. As a result, these speed oscillations may be transmitted to the carrier 30. However, the dampening spring 28 flexes to permit momentary relative rotary movement between the carrier 30 and the hub 22. The decoupler assembly 20 may optionally be configured so that friction may exist between selected components in the decoupler assembly 20 so that the flexing in the dampening spring 28 is dampened.

When the pulley 24 decelerates and rotates more slowly than the shaft 15, the force of the inner surface 43 of the pulley 24 on the clutch spring 32 in the first rotational direction is eliminated and so the clutch spring 32 retracts radially to operatively disconnect the pulley 24 from the carrier 30 and from the hub 22.

The pulley 24 and the hub 22 cooperate to define a chamber 68 in which the clutch spring 32 is disposed. In the embodiment shown the dampening spring 28 is also disposed in the chamber 68. Lubricant 70 substantially fills the chamber 68 to lubricate the clutch spring 32 and to lubricate the engagement between the clutch spring 32 and the inner surface 43 of the pulley 24 so as to control the amount of friction therebetween and to prevent damage to the inner surface 43 of the pulley 24 and to the clutch spring 32 during their engagement. As noted above, the inner surface 43 of the pulley 24 is slidably supported on the pulley support surface 48 of the hub 22. More specifically, the pulley support surface 48 and the inner surface 43 of the pulley 24 are separated by a gap G, which is shown (highly exaggerated) in FIG. 4. The gap G and a main chamber portion 72 (in which the clutch spring 32 sits) together make up the chamber 68. Thus, the gap G is filled with lubricant 70. The presence of the lubricant 70 in the gap G permits the rotational sliding motion between the inner surface 43 of the pulley 24 and the pulley support surface 48 of the hub 22. The lubricant 70 may be any suitable type of lubricant, such as a grease, such as, for example, PetroCanada Peerless LLG grease. The use of the lubricant 70 on the clutch spring may be as described in U.S. Pat. No. 7,618,337, the contents of which are hereby incorporated by reference.

The hub 22 may be manufactured from any suitable material, such as a carbon steel, and more specifically a carbon steel with 20% carbon. The pulley 24 may also be made from a carbon steel having a carbon content of approximately 20%. The inner surface 43 of the pulley 24 may be nitride hardened to a depth, which may be in the range of about 0.02 mm (but which may be less than that), and to a hardness of about 1000 HV (i.e. the Vickers pyramid number that results from the Vickers Hardness Test). The hardness level of the pulley support surface 32 may be about 75 HV.

The end cap 34 (FIG. 3) is provided to act as a seal member to seal off the second (distal) end of the gap G. Thus, the chamber 68 is sealed by the end cap 34 at one end and by the bearing 26 at the other end. The end cap 34 may be mounted to the second end 46 of the pulley 24

Figure 5:
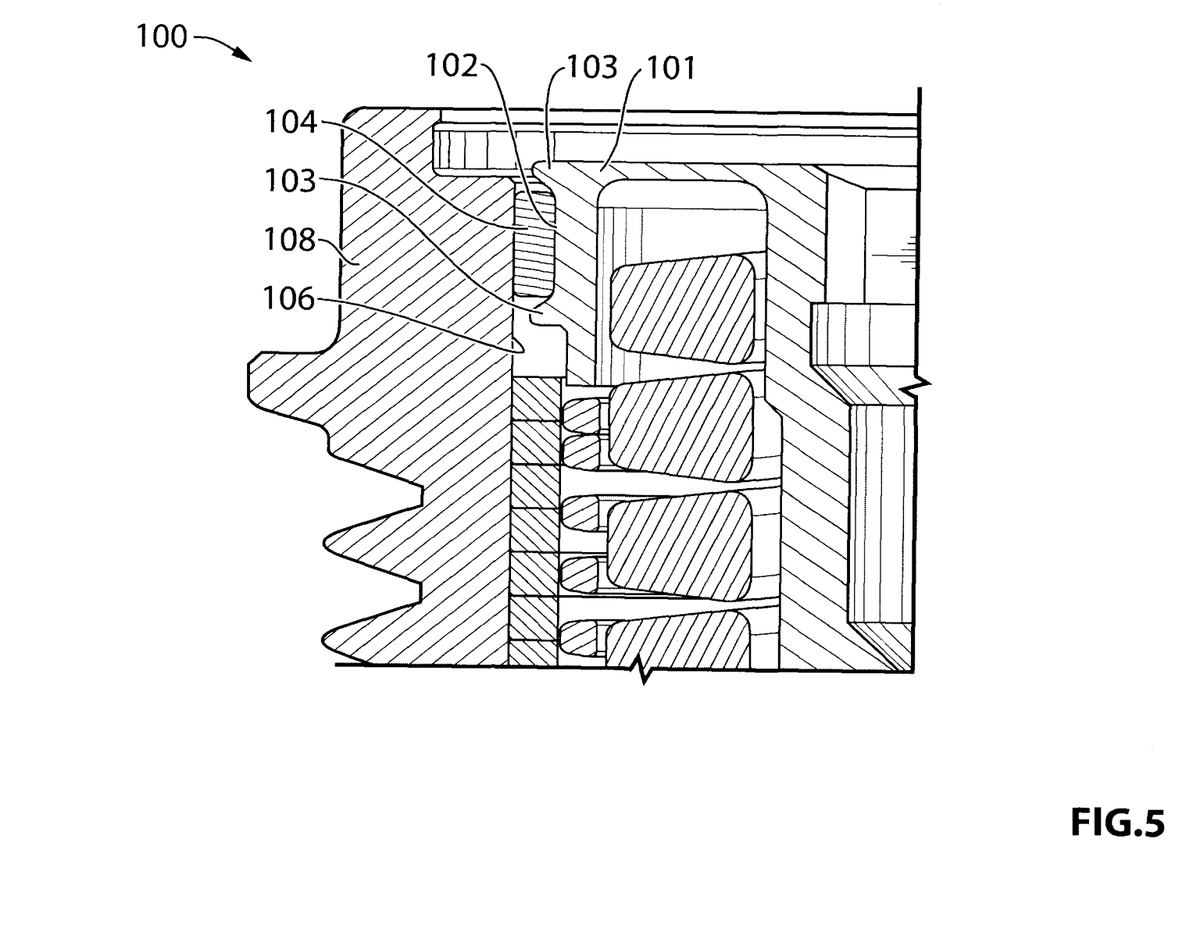
FIG. 5 is a sectional view of a decoupler assembly of the prior art.

In some prior art decoupler assemblies, as shown at 100 in FIG. 5, the hub, shown at 101, includes a groove 102 in which a polymeric bushing 104 is disposed. The groove 102 is surrounded by side ribs 103, which assist in capturing the bushing 104. The bushing 104 engages the inner surface shown at 106 of the pulley 108 so as to rotatably support the pulley 108 on the hub 101. The bushing 104 is, in some cases, nylon.

In order to install the bushing 104 on the hub 101, the bushing 104 must be stretched over the side ribs 103, a step that is generally performed manually. Prior to assembly, however, the bushing 104 may swell if it sits in an environment with high humidity. As a result, the bushing 104 may be difficult for an assembly worker to install on the hub 101.

The prior art decoupler assembly 100 performs well during use and has good longevity. Eventually during use, when excessive wear on the nylon bushing 104 occurs, alignment problems between the pulley 108 and the belt (not shown) can result, as well as problems with pitch and yaw of the belt relative to the decoupler assembly 100. This can lead to non-radially directed forces by the pulley 108 on the bearing (not shown), which can reduce the life of the bearing. Furthermore, these problems can generate increased friction between the pulley 108 and the hub 101, which can result in reduced fuel economy for the engine and noise during operation.

Furthermore, the clearance provided between the bushing 104 and the inner surface 106 of the pulley 108 on some prior art assemblies may be approximately 0.040 mm, however a relatively large tolerance of +/−0.043 mm may exist in the clearance due to many factors including, for example, tolerances in the dimensions of the bushing 104. However it can be seen that this tolerance could result in a negative clearance (i.e. an interference fit) between the bushing 104 and the inner surface 106 of the pulley 108. An interference fit can make the process of installing the pulley 108 and the hub 101 together difficult. During installation of the pulley 108 and the hub 101 together, particularly where there is an interference fit, the pulley 108 can jam on the bushing 104. This can chip, or otherwise damage the bushing 104, in which case, the bushing 104 and possibly the hub 101 and the pulley 108 could be rejected as scrap parts.

Furthermore, the relative softness of the bushing 104 in some applications can make it relatively susceptible to deformation when certain forces are exerted on it from the belt through the pulley 108. An example would be sufficiently large forces from the belt urging tilting of the pulley 108. This deformation can also lead to pitch and yaw problems with the pulley 108.

Figure 4:
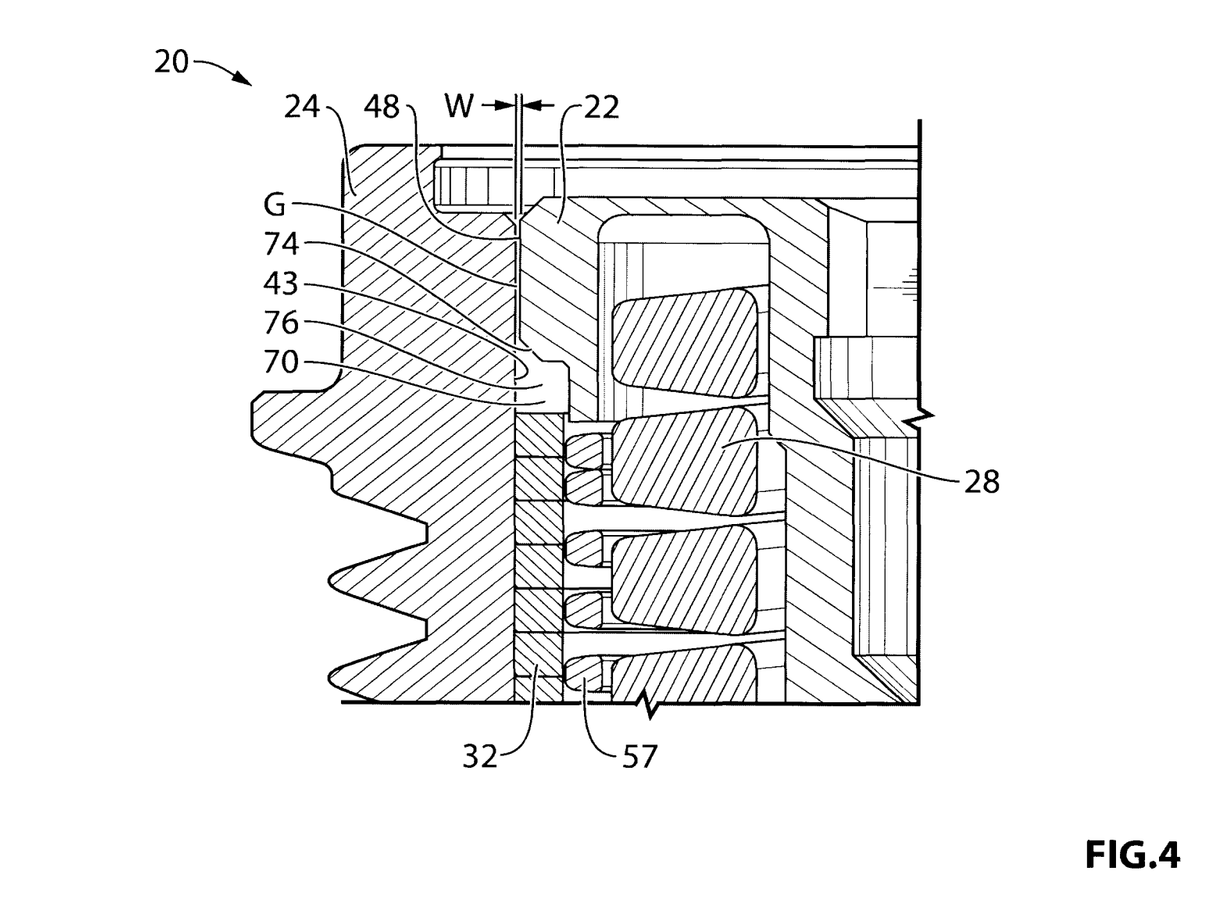
FIG. 4 is a highly magnified sectional view of a portion of the decoupler assembly shown in FIG. 1.

Referring to FIG. 4, the gap G between the surfaces 43 and 48 may have a width W that is sufficiently narrow to inhibit tilting of the pulley 24 relative to the axis A, but wide enough to permit the entry of lubricant into the gap G. The width W of the gap G may be, for example, approximately 0.0875 mm. At least in part due to the materials of construction of the hub 22 and the pulley 24, the tolerances in the width W of the gap G may be relatively smaller than those associated with the clearance in the prior art assembly 100. For example, the tolerance in the width W may be approximately +/−0.0175 mm. It will be noted that the clearance between the hub support surface 48 and the inner surface 43 (i.e. the width W of the gap G) is always positive. Accordingly, there is never an interference fit between the two components, thereby facilitating assembling the hub 22 and pulley 24 together, as compared to the hub 101 and the pulley 108 of the prior art. Furthermore, eliminating the need to install a separate item (i.e. the bushing 104) further facilitates the assembling of the hub 22 and the pulley 24 together. Also, eliminating the bushing 104 facilitates the use of an automated process to assemble the hub 22 and pulley 24, thereby further reducing the cost of the assembly. While a tolerance range of 0.035 mm (i.e. from +0.0175 mm to −0.0175 mm) is preferred, other tolerance ranges are acceptable. For example, the tolerance range may be 0.1 mm, (e.g. +0.05 mm to −0.05 mm), while ensuring that the nominal clearance between the hub 22 and the pulley 24 is never negative so that an interference fit never results.

Some form of lead-in shown at 74 (best seen in FIG. 4) may be provided at a first end of the gap G, which faces the main chamber portion 72. This lead-in 74 facilitates the entry of lubricant 70 into the gap G. This lead-in 74 may be in the form of a chamfer, in the form of a radius, or in any other suitable form.

In the embodiment shown, the lead-in 74 specifically faces a clutch spring clearance slot 76, which is formed between the hub 22 and the inner surface 43 of the pulley 24, and which is part of the main chamber portion 72. During radial expansion and contraction of the clutch spring 32, the clutch spring 32 extends and retracts axially. As noted above, however, the first end 60 of the clutch spring 32 may be fixedly connected to the carrier 30, and the carrier 30 is urged into abutment with the thrust plate 59 by the dampening spring 28 and is thus effectively fixed in position axially. As a result the first end 60 of the clutch spring 32 is fixed in position axially and so the second end 64 of the clutch spring 32 extends and retracts axially during radial expansion and contraction of the clutch spring 32. Specifically, as the clutch spring 32 expands radially it contracts axially, thereby pulling at least partially out of the slot 76, thereby permitting (and urging) the slot 76 to fill with lubricant 70. As the clutch spring 32 contracts radially, it extends axially into the slot 76 thereby urging the lubricant 70 that is in the slot 76 into the gap G. The lead-in 74 facilitates the entry of the lubricant 70 into the gap G under the urging of the clutch spring 32. In this way, the gap G is regularly 'pumped' with lubricant 70 during operation of the decoupler assembly 20. In particular, lubricant 70 is urged into the gap G when there is disengagement of the pulley 24 from the hub 22 and therefore when there is relative rotation between hub 22 and pulley 24.

Notwithstanding the issues described above, it was found surprisingly that the lubricated metal-to-metal contact between the pulley support surface 48 and the inner surface 43 of the pulley 24 resulted in better performance and greater longevity in the decoupler assembly 20 as compared to some prior art decoupler assemblies. The wear that is incurred by components that make up a sliding connection is at least in part correlated to a PV value, which is the pressure exerted between the components multiplied by the velocity between them. The pressure exerted between the components is equal to the force exerted between them divided by the area of engagement. The area of engagement is equal to the circumference multiplied by the axial length. When comparing the assembly 20 shown in FIG. 2 with the prior art assembly 100 shown in FIG. 5, the factors of velocity, circumferential distance at the interface and force may be the same between them. However, it can be seen that the axial length, shown at LB at the interface of the bushing 104 and the inner surface 106 of the pulley 108 is limited by, among other things, the presence of the side ribs 103. However, the axial length, shown at LH, at the interface of the pulley support surface 48 and the inner surface 43 of the pulley 24, is longer than the axial length LB, due at least in part to the lack of need for side ribs. As a direct result, the area of engagement between the hub 22 and the pulley 24 is greater than the area of engagement between the bushing 104 and the pulley 108. As a result of that, the pressure between the hub 22 and the pulley 24 is lower than the pressure between the bushing 104 and the pulley 108. As a result of that, the PV value for the assembly 20 is lower than the PV value for the assembly 100. The reduction in the PV value correlates to reduced wear in the area of engagement between the hub 22 and the pulley 24.

Longevity tests were carried out on examples of the decoupler assembly 20 to determine how they performed in use. One test in particular runs an engine for a selected number of hours, exposing the decoupler assembly 20 to a variety of engine conditions, such as deceleration of the engine, acceleration, city driving, highway driving, and other conditions. In one run of the test, the decoupler assembly 20 underwent 2000 hours of testing (which corresponds to a selected number of years of real-world driving), after which the decoupler assembly 20 was disassembled for inspection. Upon inspection, it was found that the decoupler assembly 20 was in good condition. In particular the bearing support surface 48 and the inner surface 43 of the pulley 24 showed essentially no signs of wear. The lubricant that was used in the test assembly 20 was also checked and was found to be in excellent condition. In another test, an example of an initial design concept of the assembly 20 underwent 4000 hours of testing (corresponding to twice the number of years of real-world driving) and was subsequently disassembled and inspected. It was found that there was little wear (0.006 mm) on the inner surface 43 of the pulley 24 and no wear on the pulley support surface 48. The lubricant condition was found to be good. It will be noted that examples of prior art assemblies similar to the assembly 100 showed significantly greater amounts of wear on the mating components (i.e. the bushing and the inner surface of the pulley).

Figure 6A:
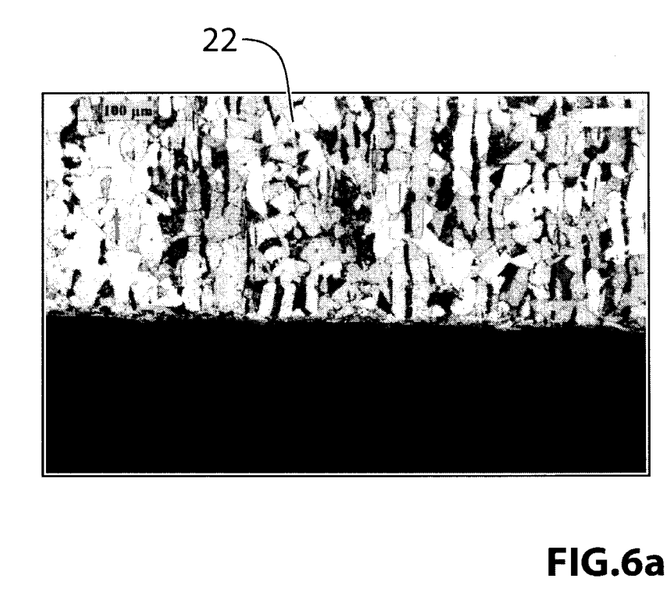
FIGS. 6a and 6b are highly magnified sectional views of the hub and the pulley respectively from a decoupler in accordance with an embodiment of the present invention, after undergoing use.
Figure 6B:
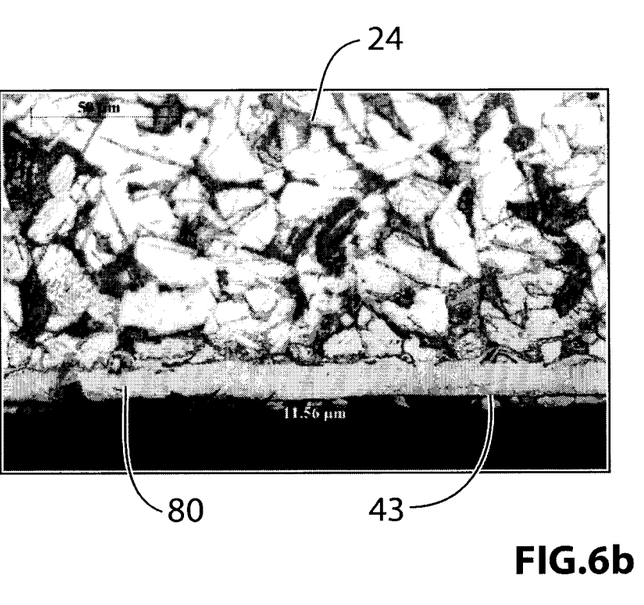

The wear on the hub 22 and the pulley 24 may be measured by any suitable means, such as by using a profile machine (not shown) which is capable of very precise measurements to show any changes in dimensions. Furthermore, the hub 22 and the pulley 24 may be sectioned and the section may be inspected as shown in FIG. 6a (which shows the hub 22) and FIG. 6b (which shows the pulley 24 along with the nitride hardened layer shown at 80).

While a helical clutch spring is shown in the figures, and while such a clutch spring is preferred for reasons which are described above, it will be understood that other types of clutch member may be used instead in the decoupler assembly 20.

In the description above, the decoupler assembly is described as being provided between the shaft of a belt-driven accessory and a belt, which is driven by the crankshaft of an engine. It will be noted, however, that in some vehicles a decoupler assembly may be provided on the crankshaft 12 of the engine 10. Such a decoupler would permit the crankshaft 12 to drive the belt 14 when the crankshaft 12 has an angular speed that is greater than the angular speed of the belt about the output axis of the crankshaft 12, but would permit the angular speed of the crankshaft 12 to oscillate relative to the angular speed of the belt 14, thereby permitting the belt 14 to momentarily overrun the crankshaft 12.

While the above description constitutes a plurality of embodiments of the present invention, it will be appreciated that the present invention is susceptible to further modification and change without departing from the fair meaning of the accompanying claims.

The invention claimed is:

1. A decoupler assembly for transferring torque between an endless drive element and a shaft, comprising:
    a hub that is adapted to be coupled to the shaft such that the shaft co-rotates with the hub about a rotational axis;
    a pulley having an outer surface and an inner surface, wherein the outer surface is adapted to engage the endless drive element, wherein a bearing is positioned between the inner surface of the pulley and the hub, and wherein the hub is made from metal and includes a pulley support surface that slidingly supports the inner surface of the pulley, wherein the bearing and the pulley support surface together support the pulley for rotation relative to the hub;
    an isolation spring positioned to transmit torque between the hub and a carrier; and
    a wrap spring clutch, wherein the wrap spring clutch expands radially to operatively connect the pulley and the carrier when the pulley is rotated faster than the hub in a first rotational direction, thereby driving the hub with the pulley, and wherein the wrap spring clutch contracts radially to operatively disconnect the pulley and the hub when the pulley rotates more slowly than the hub in the first rotational direction,
    wherein the pulley and the hub cooperate to define a chamber in which the wrap spring clutch is disposed, and which includes a gap between the pulley support surface and the inner surface of the pulley, wherein the chamber is filled with a lubricant.

2. A decoupler assembly as claimed in claim 1, wherein the gap between the inner surface of the pulley and the pulley support surface is approximately 0.0875 mm.

3. A decoupler assembly as claimed in claim 1, wherein the tolerance in the width of the gap between the inner surface of the pulley and the pulley support surface is approximately 0.0175 mm.

4. A decoupler assembly as claimed in claim 1, wherein the isolation spring is a torsion spring.

5. A decoupler assembly as claimed in claim 1, wherein the pulley has a first end and a second end axially and the bearing seals the chamber at the first end of the pulley.

6. A decoupler assembly as claimed in claim 1, wherein the pulley has a first end and a second end axially and the decoupler further comprises a seal member positioned to seal the chamber at the second end of the pulley, immediately adjacent the gap between the pulley support surface and the inner surface of the pulley.

7. A decoupler assembly as claimed in claim 1, wherein contraction of the wrap spring clutch causes the wrap spring clutch to extend axially towards the gap to urge lubricant into the gap.

8. A decoupler assembly as claimed in claim 7, wherein the chamber includes a main chamber portion and the gap, and wherein an end of the gap that faces the main chamber portion has a lead-in configured to facilitate the entry of lubricant into the gap.

9. A decoupler assembly as claimed in claim 1, further comprising a carrier, wherein the wrap spring clutch has a first end and a second end, and wherein the first end of the wrap spring clutch is fixedly connected to the carrier, wherein the carrier is fixed in position axially, and wherein the second end of the wrap spring clutch moves axially towards the gap to urge lubricant into the gap during contraction of the wrap spring clutch.

10. A decoupler assembly as claimed in claim 9, wherein the main chamber portion includes a wrap spring clutch clearance slot, wherein the end of the gap that includes the lead-in faces the wrap spring clutch clearance slot, wherein the second end of the wrap spring clutch retracts axially at least partially from the wrap spring clutch clearance slot during expansion of the wrap spring clutch which urges the entry of lubricant into the wrap spring clutch clearance slot, and wherein the second end of wrap spring clutch extends axially into the wrap spring clutch clearance slot during contraction of the wrap spring clutch to urge lubricant in the wrap spring clutch clearance slot into the gap.

11. A decoupler assembly as claimed in claim 1, wherein the inner surface of the pulley is hardened to at least a selected hardness and to at least a selected depth.

12. A decoupler assembly as claimed in claim 1, wherein the pulley has a first axial end and a second axial end, and wherein the bearing is positioned at the first axial end of the pulley, and wherein the pulley support surface of the hub supports the pulley at the second axial end of the pulley.

* * * * *